Dec. 30, 1930.  J. STEINNES  1,787,126
DEVICE FOR COATING THE INTERIOR OF WALLS OF PIPES OR CONDUITS
Filed Feb. 26, 1927  2 Sheets-Sheet 1

Witnesses:

Inventor:
Johann Steinnes

Dec. 30, 1930.     J. STEINNES     1,787,126
DEVICE FOR COATING THE INTERIOR OF WALLS OF PIPES OR CONDUITS
Filed Feb. 26, 1927     2 Sheets-Sheet 2

Patented Dec. 30, 1930

1,787,126

UNITED STATES PATENT OFFICE

JOHANN STEINNES, OF OBERHAUSEN, GERMANY

DEVICE FOR COATING THE INTERIOR OF WALLS OF PIPES OR CONDUITS

Application filed February 26, 1927, Serial No. 171,308, and in Germany March 1, 1926.

This invention relates to a device for coating the interior walls of pipes or conduits with a liquid or viscous material such as a paint or corrosive material and in particular to a device, for treating welded tubes tarred or asphalted on the inside, for renewing after welding the protective material (tar or asphalt) which has run away from the welded part. A further object of the device is to enable other operations to be carried out at the point of welding, after said welding, such as for example, cooling, cleaning and pressing the welded part before the protective material is renewed. The device is characterized principally by a vessel containing the coating material which may be inserted in the pipe and which is provided with openings closeable from the end of the device, with a device for forcing the material out of the vessel and with transversely acting packing means preventing leakage along the inner wall of the pipe. The device may be operated wholly or in part by a compressed gaseous medium which may also be employed at the same time for cleaning and pressing the parts of the interior of the tube operated upon.

Figure 1:
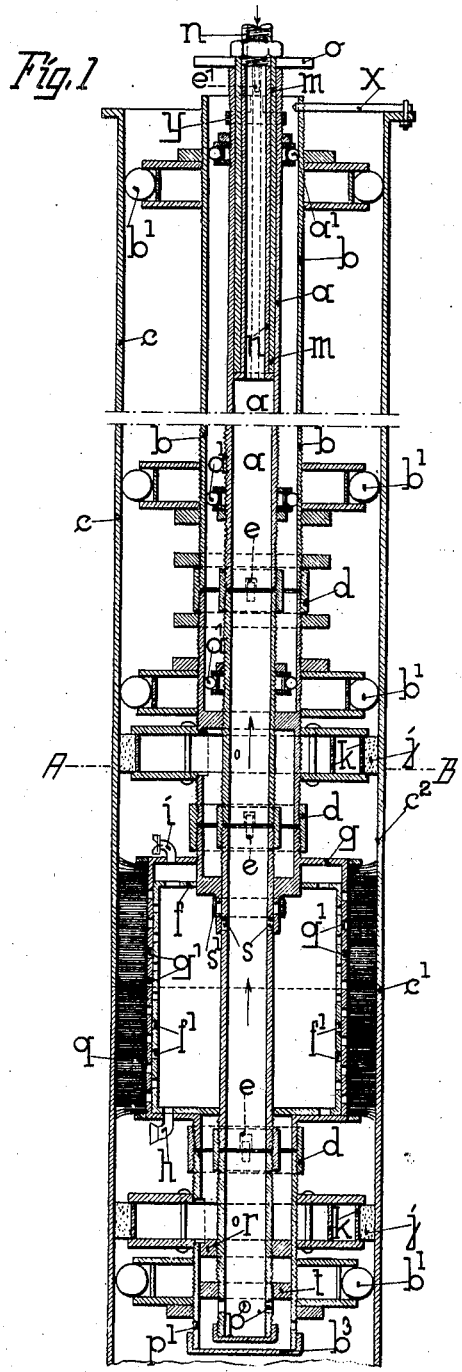
Figure 3:
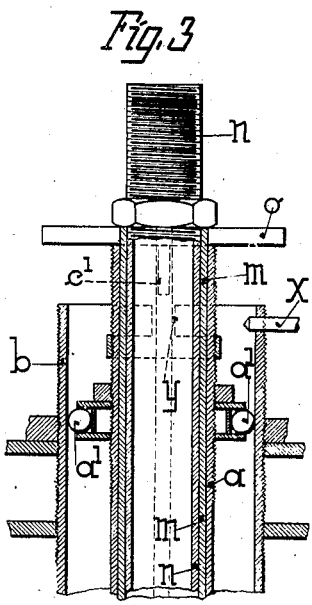
Figure 2:
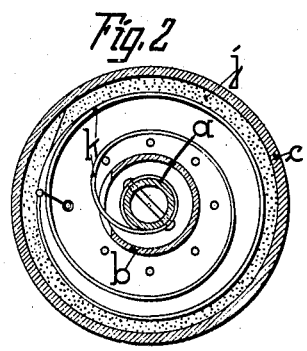

One embodiment of the invention is illustrated in Figs. 1-3,

Fig. 1 being a longitudinal section,

Fig. 2 a cross section on the line A—B in Fig. 1 and

Figure 4:
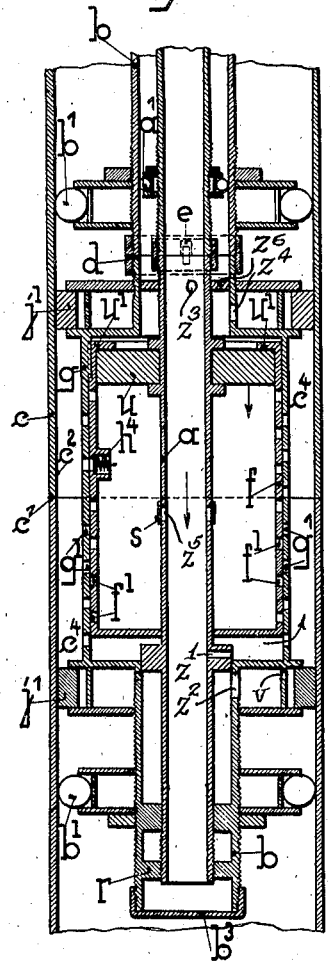

Fig. 3 illustrating a detail to a larger scale,

Fig. 4 shows a second embodiment in longitudinal section and

Figure 5:
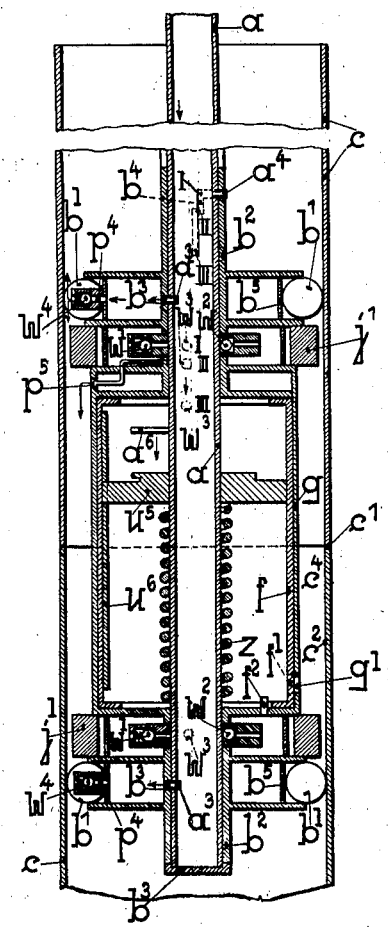

Fig. 5 another modification also in longitudinal section.

The device illustrated in Figs. 1-3 consists of two tubes $a$ and $b$, one inside the other, of which the inner tube $a$ is mounted rotatably in the outer tube $b$ by means of roller bearings $a'$ which are arranged at suitable intervals and are forced resiliently outwards. The outer tube $b$ is mounted rotatably in the pipe $c$, which represents the article to be coated, in a similar manner by means of roller bearings $b'$ also forced resiliently outwards. The tubes $a$ and $b$ consist of separate sections put together to make the desired length and held together by threaded rings $d$, the sections being prevented from rotating relatively to one another by tongues and grooves $e$. The two tubes $a$ and $b$ are connected together by a threaded guide member $r$ (Fig. 1). The vessel $f$ furnished with peripheral outlet openings $f'$, with an inlet pipe $h$ and with an overflow or safety valve $i$ is arranged in the length of pipe $a$. The length of pipe $b$ is provided with a vessel $g$ fitting around the vessel $f$ and provided with outlet openings $g'$ corresponding to the openings $f'$ and with a peripheral brush $q$ or with strips of material. On either side of these vessels there are annular cushion members $j$ forced outwardly by a spiral spring $k$, (see also Fig. 2) to bear against the inner wall of the tube $c$. The inner end of the spring $k$ is connected to the tube $a$ so that axial rotation of the tube $a$ in one direction releases the spring $k$ to press the cushion member $j$ against the wall $c$ whereas rotation of the tube $a$ in the opposite direction draws in the spring $k$ and therewith the cushion member $j$. One end (the left hand end in the drawing) of each of the tubes $a$ and $b$ is closed by a cap $b^3$ or the like while the other end of the tube $a$ is entered by a section of tube $m$ which fits therein in such a manner as to be capable of axial movement, is coupled therewith by a tongue and groove $e'$ and is provided with a handle $o$. A tube $n$ (see Fig. 3) for connection to a compressed air conduit or the like is fitted rotatably in the said section or tube $m$.

For use the vessel $f$ is filled through the pipe $h$ with the material to be coated on the interior wall $c^2$ of the pipe, such as tar or asphalt, corrosive liquid or paint material and the tubes $a$ and $b$ together with the connecting tubes $m$ and $n$ are inserted so far into the pipe $c$ to be treated that the vessels $f, g$ are situated just before the parts to be provided with coating material, that is for example, just before the welding seam $c'$, to be tarred or asphalted, of the pipe $c$. Compressed air is then admitted to the tubes $n$, $a$ which emerging from the tubes $a$ and $b$ at $p$ and $p'$, cools if necessary the weld $c'$ and blows away any dirt situated at the part $c'$ to be treated. After this the device is further inserted in the tube $c$ until the vessels $f$ and $g$ are in the position illustrated in Fig. 1, namely, opposite to the part $c'$ of the tube $c$ to be treated with coating material. The tube $b$ is then fixed by means of a pin $x$ or the like, the tube $a$ being rotated by means of the tube $m$ and its handle $o$ so as to release the springs $k$ and to force the cushion members $j$ tightly on the wall $c$ of the pipe. Simultaneously the tube $a$ is forced axially by means of the threaded guide $r$ in the tube $b$ in the direction of the arrow in Fig. 1 until the holes $f'$ of the vessel $f$ register with those $g'$ of the vessel $g$. By this axial movement of the tube $a$ the openings $p$ are furthermore closed by a ring $t$ mounted on the tube $b$. The compressed air emerging at $s$ and $s'$ from the tube $a$ into the vessel $f$, pressing at the same time on the cushion member $j$, forces the coating material out from $f$ and $g$ and into the brush $q$. Next the tube $m$ is moved so far into the tube $b$ that the handle $o$ engages in a recess $y'$ in the tube $b$, the tube $b$ then being turned by means of the handle $o$ so that the brush $q$ is rotated and the material coated on the interior of the tube $c$ with the assistance of the compressed air. When this has been effected the superfluous material may be drawn back into the vessel $f$ by means of an air pump, jet exhauster or the like connected to $n$ whereupon the tube $a$ is screwed back in the opposite direction to the arrow (Fig. 1), the vessel $f$ being re-closed and the cushion members $j$ drawn in once more so that the entire device may be removed from the pipe $c$. If the coating material is to be heated the vessel $f$ may also be provided with a heating device.

In the modification of the device illustrated in Fig. 4 the coating material is forced out from the vessel $f$ by means of a piston instead of by a gaseous pressure medium. For this purpose the inner tube $a$ is furnished with a piston $u$. This device is employed as follows:—

The vessel $f$ is, similarly to the device illustrated in Figs. 1–3, filled with the material to be coated upon the inner wall $c^2$ of the pipe and the device is immediately inserted so far into the tube $c$ that the passages $f'$, $g'$ are situated opposite to the part $c'$ of the tube $c$ to be furnished with coating material. Compressed air or the like is then admitted to the tube $a$, said air emerging through the openings $p$ in the tube $a$ and the openings $v$ in the tube $b$ into the annular space $c^4$ between the vessel $g$ and the tube $c$ thus cleansing the part $c'$ of tube to be coated. The tube $a$ is next rotated by means of the handle $o$ (not illustrated) whereby the tube $a$ is displaced, due to the threaded guide $r$, in the tube $b$ in the direction of the arrow in Fig. 4. Since at first the openings $f'$ of the vessel $f$ are still closed the vessel $f$ is moved in the direction of the arrow in Fig. 4 until it arrives at the end, in the direction of the arrow, of the outer vessel $g$. The openings $f'$ and $g'$ register in this position and on further rotation of the tube $a$, accompanied by further displacement of the piston $u$ in the same direction of movement, the material will be forced out, in certain cases assisted by the compressed air or the like in the tube $a$, from the vessel $f$ into the annular space $c^4$ situated between the tube $g$ and the pipe $c$. As before the said annular space is closed at the sides and tightly packed by rings $j'$ which in the present example are pressed against the inner wall $c$ of the pipe, not by springs under compression, but by their own resilience assisted by the compressed air from $a$ acting on them from the inside. When the space $c^4$ has been filled with the material forced out from $f$, the said material thus exerting pressure on the pipe portion $c'$, remaining material not employed is drawn back into the vessel $f$ with the aid of an air pump or the like connected to the outer end of the tube $a$. The tube $a$ is then rotated in the opposite direction to what it was before or drawn back whereby the piston $u$ is again moved into the vessel $f$ in a direction opposite to that of the arrow, thus forcing the vessel $f$ by means of abutments $u^1$ into its original position, closing the openings $f^1$. The entire device may then be removed again from the tube $c$.

If compressed air is left to act on the tube $a$ such compressed air, when the tube is in the position illustrated in Fig. 4, discharges out of the port $z'$ into the annular space $c^4$, pressure not yet being exerted on the rings $j'$, and blows out through the joint $c'$ cleaning the same. When the tube is moved a little in the desired direction of port $z'$ registers with the port $z^2$ in the tube $b$ and consequently the rings $j'$ are expanded. When the pipe is moved further, the ports $f'$ register with the ports $g'$, and the compressed air discharges through the ports $z^5$ which is covered by a screen $s$ into the vessel $f$ exerting pressure on the coating material therein, assisting in expelling it into the annular space $c^4$ with the aid of the piston $u$.

$h^4$ is an inwardly opening check valve, which as soon as the receptacle $f$ is returned to the position shown in Fig. 4, allows the surplus of the coating material to be sucked back into such receptacle.

The opening $z'$ upon axial displacement of the central tube $a$ comes into register with the opening $z^2$, then the opening $z^3$ in tube $a$ will register with the opening $z^4$ in the tube $b$, and consequently the compressed air in the tube $a$ passes through openings $z'$ and $z^2$ against the lower packing ring $j'$, and through the openings $z^3$ and $z^4$ against the upper packing ring $j'$, so that both rings are pressed outwardly simultaneously. The plate $z^6$ near $z^3$ is fixed to receptacle $g$ and its purpose is to prevent the passage of air from the cylindrical space formed between the tube $a$ and the upper tube $b$ upon the opening $z^3$ being so disposed as to admit air to this cylindrical space.

The modification illustrated in Figure 5 constitutes a simplified arrangement in so far as only the tube $a$ for introducing the gaseous pressure agent extends to one end of the pipe $c$ to be treated. The movement of the tube $a$ with the vessel $f$ relatively to the shortened tube $b^2$ with the vessel $g$ is effected in the present case by bringing orifices in the tubes $a$ and $b^2$ one after another into register, whereupon the pressure agent, emerging through these outlets, secures the tube $b^2$ with the vessel $g$ in the pipe $c$, exerts pressure on the part to be operated upon and forces the coating material out from the vessels $f$, $g$. The tube $b^2$ is furnished as before with ball bearings $b^1$ and with expansible packing rings $j^1$ on either side of the vessel $g$. Within each of these packing rings the tube $b^2$ is provided with one or more non-return valves $w^1$ open towards the expansible rings and with valves $w^2$ which are released from their seats when the tube $a$ is rotated relatively to the tube $b^2$ to such an extent that an opening $w^3$ in the tube $a$ comes beneath the valves $w^2$. The tube section $b^2$ is further provided with an outlet opening $p^5$ discharging into the annular space between the expansible packing members $j^1$ and covered by a mesh screen. As in the modification described above the vessel $f$ contains a piston $u^5$, which, in the present case, is displaceable axially in the vessel $f$ against the pressure of a spring $z$. For the purpose of being rotated or displaced together with the tube $a$ the piston $u^5$ may be coupled therewith by means of a member $a^6$ of any suitable type. The tubes $a$ and $b^2$ are coupled by a pin $a^4$, on the tube $a$, engaging in a stepped member $b^4$ on the tube $b^2$ or vice versa, in such a manner that they may be rotated relatively to one another and moved axially relatively to one another in steps. The tube $b^2$ is provided furthermore with one or more outlet orifices $p^4$ which are, in the present case, covered by non-return valves $w^4$. In the original positions of the tubes $a$ and $b^2$, illustrated in the drawing, the orifices $p^4$ communicate with the registering openings $a^3$, in the tube $a$, and $b^3$, in the tube $b^2$, for the pressure agent. The pressure agent entering through $a$ is conducted through the passages $a^3$, $b^3$ under a ring $b^5$ supporting the balls $b^1$. If therefore the tube $a$ is subjected to pressure, for example by means of a hand air pump, the pressure agent first of all forces, by means of the ring or rings $b^5$, the ball bearing or bearings $b^1$ securely against the wall of the pipe $c$, forces its way through the valve $w^4$ and flows through the pipe $c$, thus cooling and cleaning the welded part $c^1$. For this purpose the device may either have been moved forward to the part $c^1$ to be coated or may be situated at a distance therefrom; in the latter case the balls $b^1$ are, after the part $c^1$ has been cooled, moved forward, under the pressure acting thereon, in the pipe $c$ to the position illustrated, thus removing therefrom any dirt which has collected on the wall of the pipe. The tube $a$ is next rotated relatively to the pipe $b^2$, secured by the ball bearings $b^1$, to such an extent that the openings $w^3$ in the tube $a$ (position I) register with the passages $w^1$ in the tube $b^2$, the openings $a^3$, $b^3$ being, however, not yet entirely covered. The packing rings $j^1$ are forced outwardly by the pressure agent entering at $a$ and thus pack the operating space $c^4$.

After the packing rings $j^1$ have been expanded by the pressure agent emerging from $w^1$, the tube $a$ controlled by the guide $a^4$, $b^4$ may be moved axially from the position, relatively to the tube $b^2$, illustrated in Figure 5 in the direction of the arrow in Figure 5 (position II) and rotated tangentially relatively to the tube $b^2$ until the opening $w^3$ in the tube $a$ registers with the outlet orifice $p^5$. The pressure agent passes into the annular space $c^4$ between $c$, $g$ and the packing members $j^1$ and subjects the said space to pressure so that any leakages at the weld $c^1$ may be observed. After said weld has been subjected to pressure an outlet, not illustrated, at the outer end of the tube $a$, is opened and the air at the weld $c^1$ released. The tube $a$ is then displaced axially in the tube $b^2$ until (position III) its orifice $w^3$ is inside the vessel $f$, in which position the piston $u^5$ is coupled by the member $a^6$ with the tube $a$ and thereupon the vessel $f$ is rotated by means of the piston $u^5$, which is connected therewith by said member $u^6$, as far as a stop $f^2$ on the vessel $g$. The opening or openings $f^1$ and $g^1$ of the vessels $f$ and $g$ are thereby brought into register. The piston $u$ is then moved forward against the force of the spring $z$ either by the pressure agent entering through $a$ or, if there is sufficient space in the pipe $c$, by further movement of the tube $a$, or by both means, so that the contents of the vessel $f$ is forced into the annular space $c^4$. When the space $c^4$ has thus been filled with coating material, the tube $a$ is drawn back axially in a direction opposite to the arrow under the control of the members $a^4$, $b^4$, and is rotated tangentially. The pressure agent having been released the piston $u^5$ moves back under the pressure of the spring $z$, the remaining unused material being drawn back into the vessel $f$. When the opening $w^3$ again arrives in the position I, the tube $a$ is rotated until the opening $w^3$ registers with the valve $w^2$, thus releasing the expansible packing $j^1$, since the pressure agent acting thereon can escape through $w^2$, $w^3$. The entire device may then be removed from the pipe.

I claim:—

1. A device for coating the interior surfaces of pipes or conduits with paint, insulating material, corrosive substance or the like, comprising in combination, a vessel provided with outlet orifices and adapted to be inserted containing said coating material, means controlled from an end of the pipe for regulating the outlet orifices in said vessel and for ejecting the coating material from the latter, and a piston adapted to be moved from the end of the pipe longitudinally of the vessel to eject the coating material therefrom.

2. A device for coating the interior surfaces of pipes or conduits with paint, insulating material, corrosive substance or the like, comprising in combination, a vessel provided with outlet orifices and adapted to be inserted containing said coating material, means controlled from an end of the pipe for regulating the outlet orifices in said vessel and for ejecting the coating material from the latter, a piston adapted to be moved from the end of the pipe longitudinally of the vessel to eject the coating material therefrom, and springs opposing the piston in one direction.

3. A device for coating the interior surfaces of pipes or conduits with paint, insulating material, corrosive substance or the like, comprising in combination, a vessel provided with outlet orifices and adapted to be inserted containing said coating material, means controlled from an end of the pipe for regulating the outlet orifices in said vessel and for ejecting the coating material from the latter, a tube extending from the part of the pipe to be treated at least to one end thereof for supplying a gaseous pressure agent to the vessel, and having outlet orifices therein for supplying the gaseous pressure agent from such tube into the pipe, said openings regulable from the end of said pipe.

4. A device for coating the interior surfaces of pipes or conduits with paint, insulating material, corrosive substance or the like, comprising in combination, a vessel provided with outlet orifices and adapted to be inserted containing said coating material, means controlled from an end of the pipe for regulating the outlet orifices in said vessel and for ejecting the coating material from the latter, a tube extending from the part of the pipe to be treated at least to one end thereof for supplying a gaseous pressure agent to the vessel, and expansible packing rings on each side of and between the vessel and the pipe, said tube having outlet orifices for conveying the pressure agent to the expansible packing rings for packing the vessel against the pipe.

5. A device for coating the interior surfaces of pipes or conduits with paint, insulating material, corrosive substance or the like, comprising in combination, a vessel provided with outlet orifices and adapted to be inserted containing said coating material, means controlled from an end of the pipe for regulating the outlet orifices in said vessel and for ejecting the coating material from the latter, a tube extending from the part of the pipe to be treated at least to one end thereof for supplying a gaseous pressure agent to the vessel, and expansible packing rings on each side of and between said vessel and the pipe, said tube having outlets adapted to open in succession, the opening of the first admitting the pressure agent to the pipe, the opening of the second admitting the pressure agent to the expansible packing rings, and the opening of the remaining outlets allowing the pressure agent to enter the vessel.

6. A device for coating the interior surfaces of pipes or conduits with paint, insulating material, corrosive substance or the like, comprising in combination, a vessel provided with outlet orifices and adapted to be inserted containing said coating material, means controlled from an end of the pipe for regulating the outlet orifices in said vessel and for ejecting the coating material from the latter, a piston displaceable in the vessel to eject the coating material therefrom in combination with a tube for supplying a gaseous pressure agent acting on the piston in one of its directions of movement.

7. A device for coating the interior surfaces of pipes or conduits with paint, insulating material, corrosive substance or the like, comprising in combination, a vessel provided with outlet orifices and adapted to be inserted containing said coating material, means controlled from an end of the pipe for regulating the outlet orifices in said vessel and for ejecting the coating material from the latter, a tube extending from the part of the pipe to be treated at least to one end thereof for supplying a gaseous pressure agent to the vessel, expansible packing rings on each side of and between said vessel and the pipe, said tube having outlets adapted to open in succession, the opening of the first admitting the pressure agent to the pipe, the opening of the second admitting the pressure agent to the expansible packing rings, and the opening of the remaining outlets allowing the pressure agent to enter the vessel, and a piston displaceable in the vessel to eject coating material therefrom, the gaseous pressure agent supplied through the tube acting on the piston in one of its directions of movement.

8. A device for coating the interior surfaces of pipes or conduits with paint, insulating material, corrosive substance or the like, comprising in combination, a vessel provided with outlet orifices and adapted to be inserted containing said coating material, means controlled from an end of the pipe for regulating the outlet orifices in said vessel and for ejecting the coating material from the latter, a tube extending from the part of the pipe to be treated at least to one end thereof for supplying a gaseous pressure agent to the vessel, packing means on each side of and between the vessel and the pipe, said packing means being rendered operative and inoperative by the movement of the tube.

9. A device for coating the interior surfaces of pipes or conduits with paint, insulating material, corrosive substance or the like, comprising in combination, a vessel provided with outlet orifices and adapted to be inserted containing said coating material, means controlled from an end of the pipe for regulating the outlet orifices in said vessel and for ejecting the coating material from the latter, a tube extending from the part of the pipe to be treated at least to one end thereof for supplying a gaseous pressure agent to the vessel, and means for guiding the device on the inner wall of the pipe.

10. A device for coating the interior surfaces of pipes or conduits with paint, insulating material, corrosive substance or the like, comprising in combination, a vessel provided with outlet orifices and adapted to be inserted containing said coating material, means controlled from an end of the pipe for regulating the outlet orifices in said vessel and for ejecting the coating material from the latter, a tube extending from the part of the pipe to be treated at least to one end thereof for supplying a gaseous pressure agent to the vessel, said tube having pressure agent outlets therein, and means movable relatively to the tube by the displacement of which the outlets therein are opened and closed.

11. A device for coating the interior surfaces of pipes or conduits with paint, insulating material, corrosive substance or the like, comprising in combination, a vessel provided with outlet orifices and adapted to be inserted containing said coating material, means controlled from an end of the pipe for regulating the outlet orifices in said vessel and for ejecting the coating material from the latter, a tube extending from the part of the pipe to be treated at least to one end thereof for supplying a gaseous pressure agent to the vessel, said tube having pressure agent outlets therein, and means movable relatively to the tube by the displacement of which the outlets therein and in the vessel are opened and closed.

12. A device for coating the interior surfaces of pipes or conduits with paint, insulating material, corrosive substance or the like, comprising in combination, a vessel provided with outlet orifices and adapted to be inserted containing said coating material, means controlled from an end of the pipe for regulating the outlet orifices in said vessel and for ejecting the coating material from the latter, a tube extending from the part of the pipe to be treated at least to one end thereof for supplying a gaseous pressure agent to the vessel, said tube having pressure agent outlets therein, and tubular means movable relatively to the tube by the displacement of which the outlets therein are opened and closed.

13. A device for coating the interior surfaces of pipes or conduits with paint, insulating material, corrosive substance or the like, comprising in combination, a vessel provided with outlet orifices and adapted to be inserted containing said coating material, means controlled from an end of the pipe for regulating the outlet orifices in said vessel and for ejecting the coating material from the latter, a tube extending from the part of the pipe to be treated at least to one end thereof for supplying a gaseous pressure agent to the vessel, said tube having pressure agent outlets therein, and tubular means movable relatively to the tube by the displacement of which the outlets therein and in the vessel are opened and closed.

In testimony whereof, I have signed my name to this specification.

JOHANN STEINNES.